Nov. 20, 1951      R. C. WAY      2,575,696

TIMBER-MOWING SAW ATTACHMENT FOR FARM TRACTORS

Filed Aug. 3, 1948      5 Sheets-Sheet 1

Roy C. Way
INVENTOR.

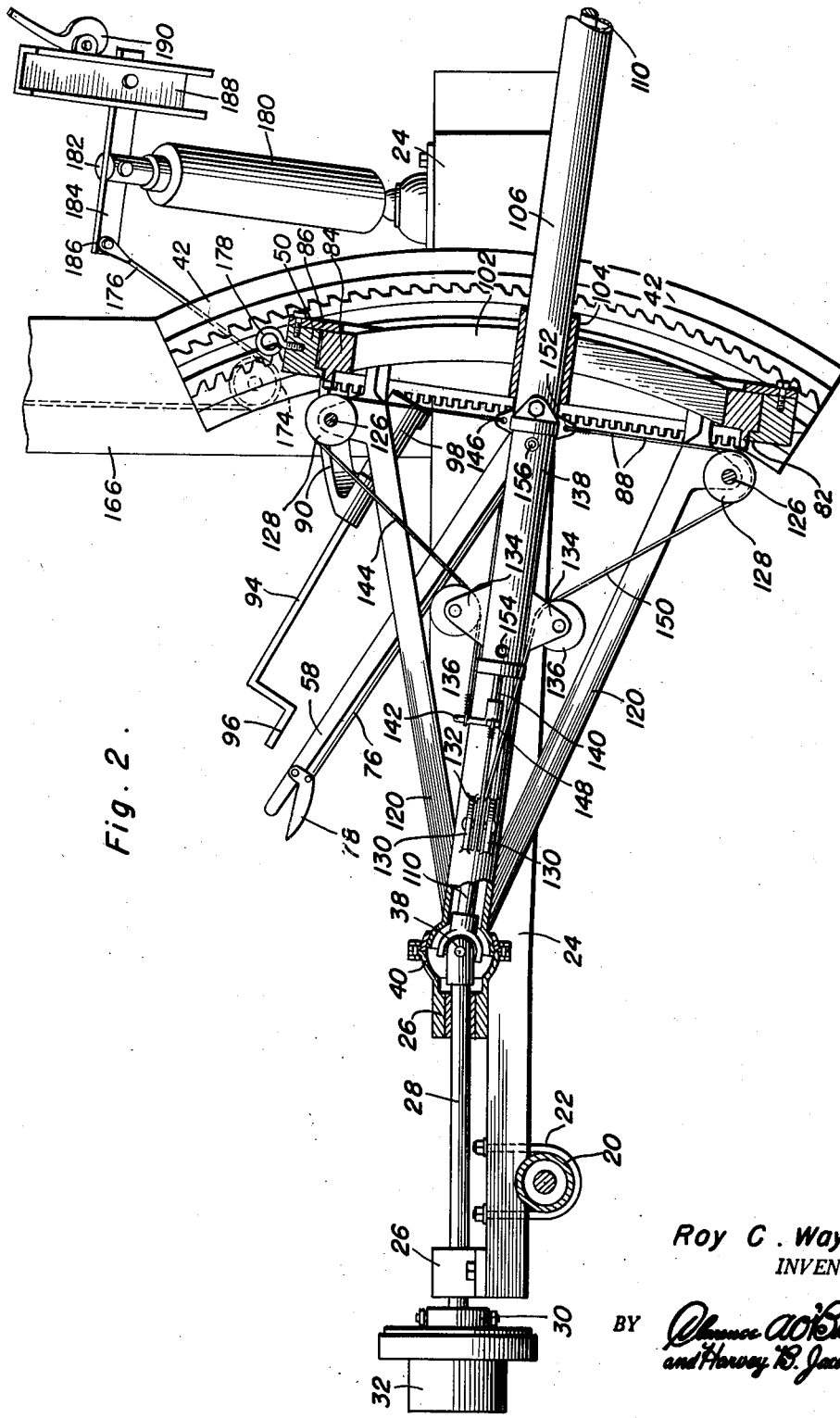

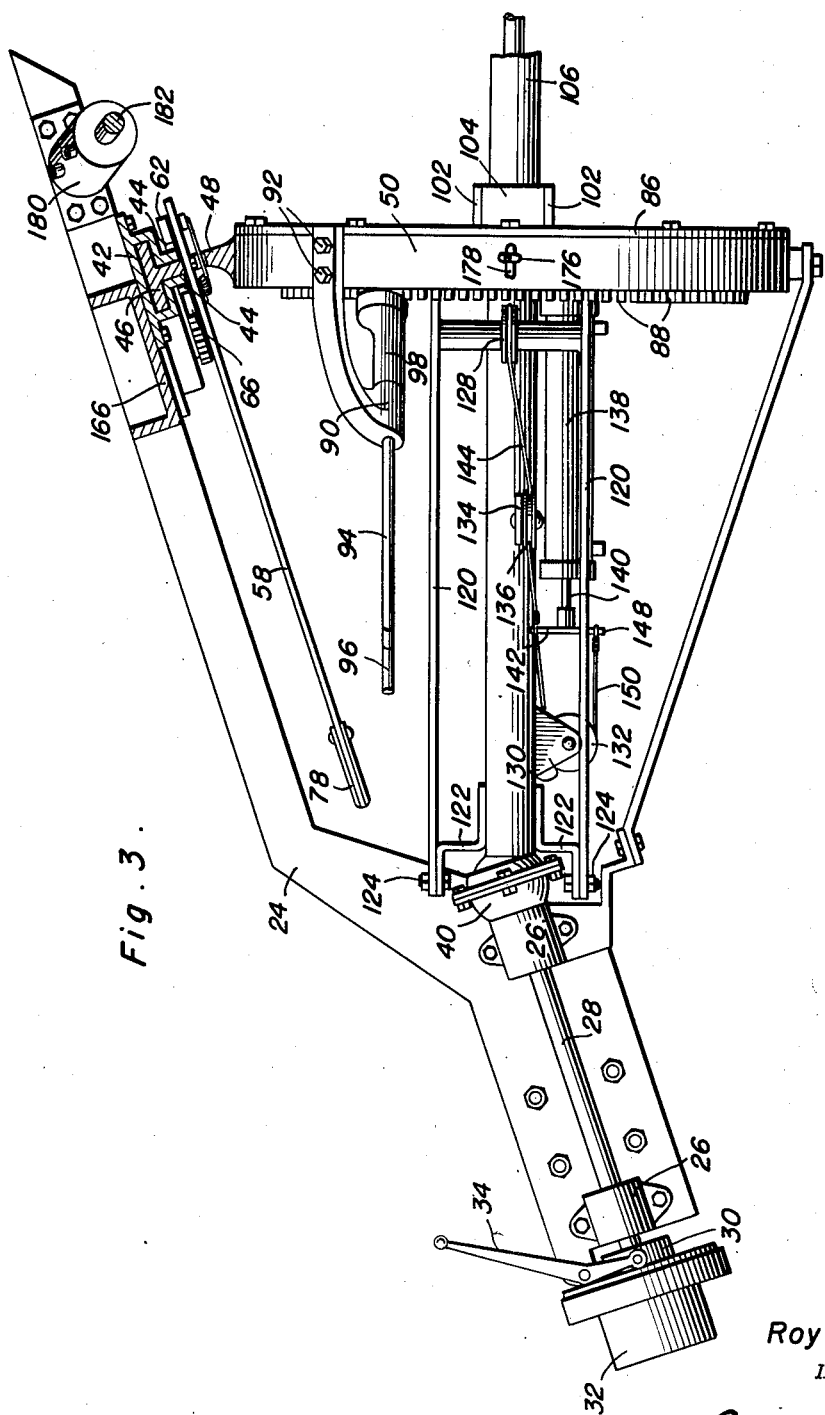

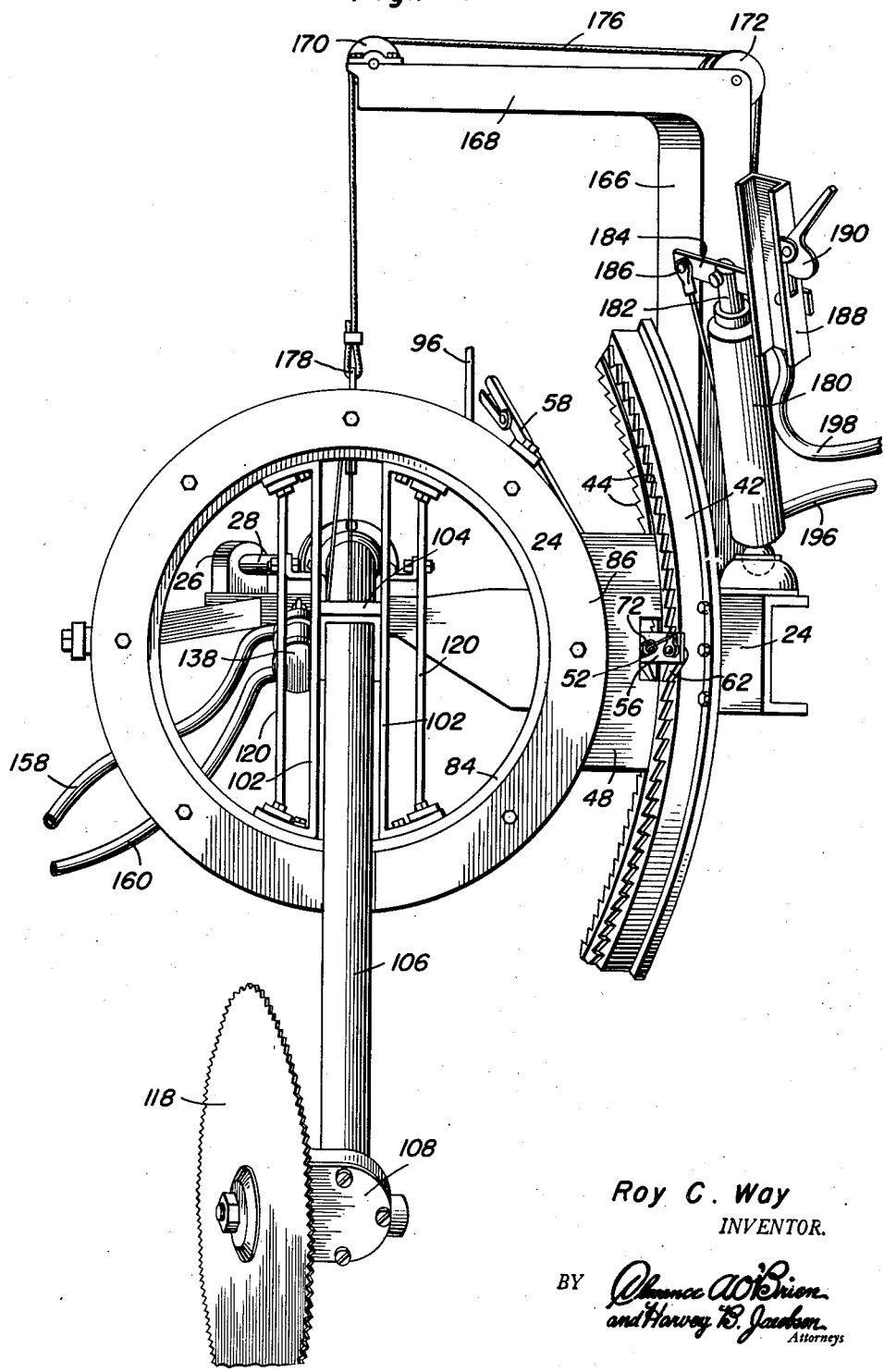

Nov. 20, 1951  R. C. WAY  2,575,696
TIMBER-MOWING SAW ATTACHMENT FOR FARM TRACTORS
Filed Aug. 3, 1948  5 Sheets-Sheet 5
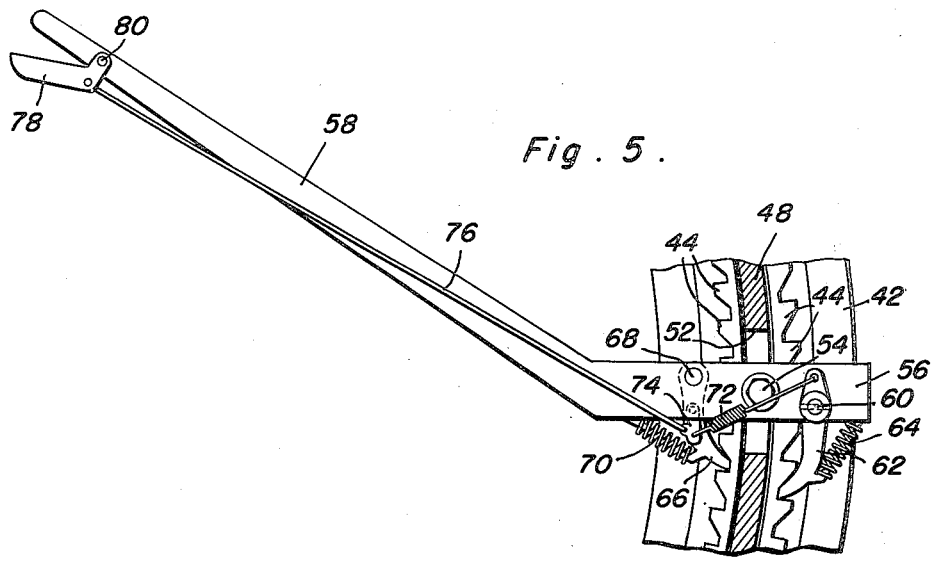
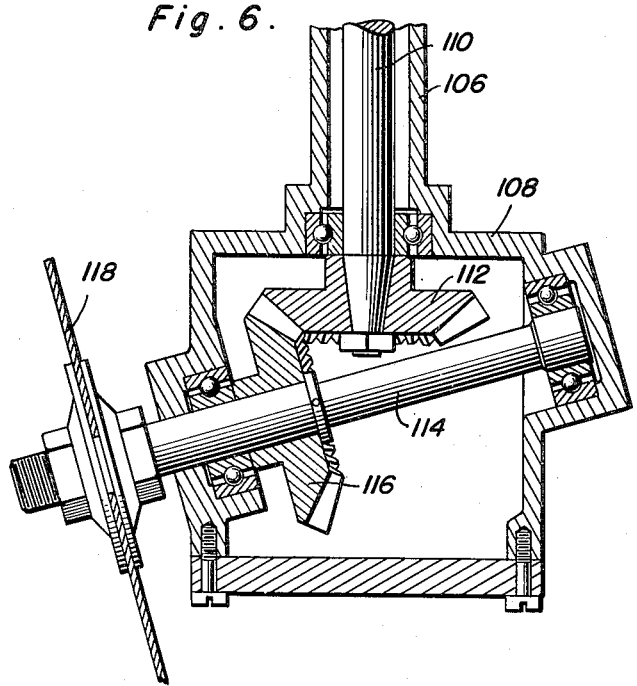
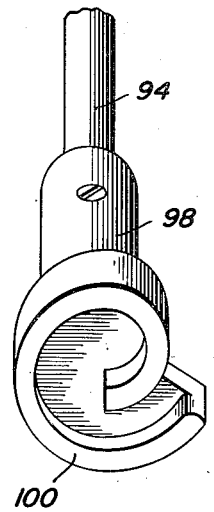
Roy C. Way
INVENTOR.

Patented Nov. 20, 1951

2,575,696

UNITED STATES PATENT OFFICE 2,575,696

TIMBER-MOWING SAW ATTACHMENT FOR FARM TRACTORS

Roy C. Way, Tennessee, Ill.

Application August 3, 1948, Serial No. 42,254

12 Claims. (Cl. 143—43)

This invention relates to a saw attachment for a farm tractor and has for its primary object to facilitate the cutting down of trees, high brush and similar growths and the like.

Another object is to facilitate the cutting of logs and the like lying on the ground into shorter lengths.

A further object is to push the tree or the like away from the saw and the tractor to prevent the binding of the saw in the kerf, and prevent the tree or like object from falling on to the equipment.

The above and other objects may be attained by employing this invention which embodies among its features a carrier mounted on a farm tractor to rotate about an axis which lies alongside of the tractor, a cross head mounted in said carrier to move transversely thereof, a drive shaft mounted in said cross head to rotate about its longitudinal axis and to move with said cross head, a saw mounted adjacent one end of the drive shaft to move in unison therewith, means to establish driving connection between the drive shaft and the saw and means to establish driving connection between the power take-off of the tractor and the drive shaft.

Other features include means mounted adjacent the drive shaft and coupled to the cross head positively to move said cross head relative to the carrier and thereby move the saw against the work, means carried by the tractor adjacent the carrier positively to rotate the carrier about the axis alongside of the tractor, and means within easy reach of the tractor operator's seat for governing the cross head moving means, the carrier rotating means and the rotation of the drive shaft.

Still other features include means within easy reach of the operator of the tractor for raising or lowering the carrier relative to the tractor.

In the drawings:

Figure 2 is a vertical sectional view taken substantially along the line 2—2 of Figure 1 showing the parts on an enlarged scale;

Figure 3 is a horizontal sectional view showing certain parts of Figure 2 in plan;

Figure 4 is a front view in elevation of the saw attachment;

Figure 5 is an enlarged fragmentary view partially in section of the carriage raising and lowering mechanism;

Figure 6 is a horizontal sectional view through the forward end of the drive shaft housing and gear housing illustrating the drive gears for the saw, and Figure 7 is an enlarged fragmentary perspective view of worm employed for rotating the carrier.

Figure 1:
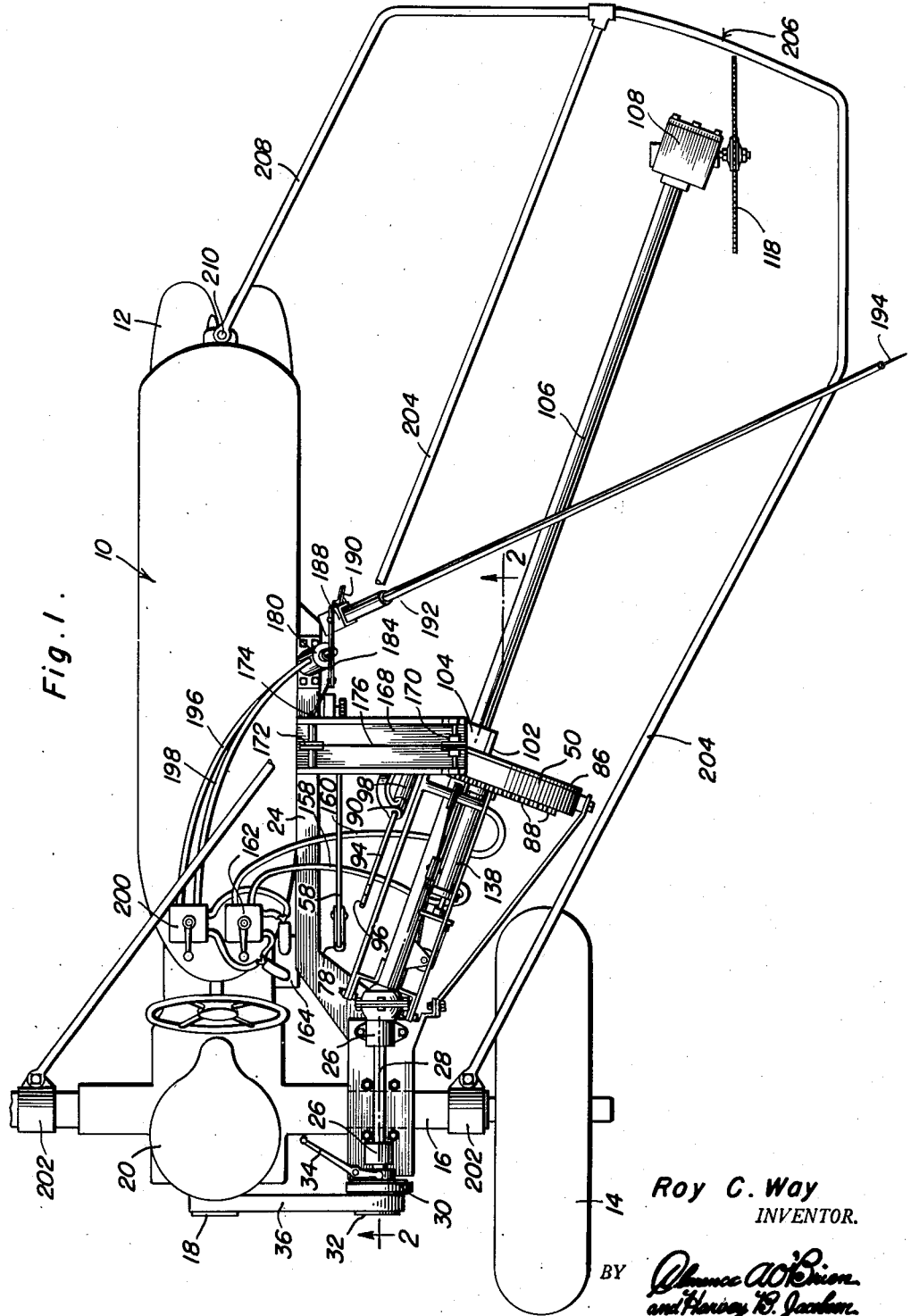
Figure 1 is a plan view of a tractor showing this improved saw attachment mounted thereon.

Referring to the drawings in detail a farm tractor designated generally 10 is equipped with conventional front steering wheels 12 and with traction wheels 14 mounted at opposite ends of a transversely extending rear axle 16. The tractor is provided at its rear end with a conventional power take-off mechanism driving a pulley 18 and adjacent the rear end the tractor is equipped with a driver's seat 20 of conventional form.

Coupled as by U-bolts 22 to the axle 16 (Figure 2) is the rear end of a frame 24 supporting this improved saw and control mechanism therefor. The frame 24 is also attached adjacent its forward end to one side of the chassis of the tractor, and mounted in longitudinally spaced relation on the frame 24 adjacent its rear end are journal bearings 26 in which a shaft 28 is mounted to rotate. This shaft is equipped adjacent its rear end with a clutch 30 through the medium of which driving connection is established with a drive pulley 32 so that by manipulating the hand lever 34 which, as illustrated in Figure 1, projects toward the driver's seat 20, driving connection may be established between the pulley 32 and the shaft 28. The pulley 32 is driven by an endless belt 36 which is trained over the pulley 18 previously mentioned so that when the engine of the tractor is in operation and coupled with the power take-off, the pulley 32 will be driven. The end of the shaft 28 remote from the clutch 30 is equipped with a universal joint 38 contained within a conventional universal bell housing 40.

Fixed to the frame 24 adjacent its forward end is an arcuate guide member 42, the curvature of which lies concentric about the axis of the universal joint 38 and carried by said guide member are oppositely disposed outwardly extending teeth 44 for a purpose to be more fully hereinafter explained. As illustrated in Figure 5 these teeth lie in concentric spaced rows about the axis of the universal joint 38 and the teeth of one row are staggered with relation to those of the opposite row.

Mounted for sliding movement in the guide 42 is a shoe 46 (Figure 3) carrying a bracket arm 48 which extends outwardly between the rows of teeth 44 and supports a ring-shaped carriage 50. The bracket arm 48 is provided intermediate its upper and lower ends with a slot 52 (Figure 5) and pivotally connected to the bracket arm as at 54 and extending through the slot 52 is a rock arm 56 carrying at one end a hand lever 58 which as illustrated in Figure 1 extends upwardly and rearwardly and terminates at a point within easy reach of the operator occupying the driver's seat 20 of the tractor 10. Pivotally supported as at 60 adjacent the end of the rock lever 56 remote from the hand lever 58 is a pawl 62 which is urged under the influence of a compression coil spring 64 into contact with the teeth 44 of the row of teeth facing the forward end of the device. A similar pawl 66 is pivotally supported as at 68 near the end of the rock arm 56 adjacent the hand lever 58, and this pawl is urged into contact with the row of teeth 44 facing the rear end of the tractor under the influence of a compression coil spring 70. It will thus be seen that by rocking the hand lever 58, the rock lever 56 will be moved to cause the pawls 62 and 66 alternately to engage successive teeth in their respective rows of teeth 44 to cause the bracket 48 and carriage 50 to move upwardly in an arcuate path concentric with the axis of the universal joint 38. In order that the carriage may be lowered, by movement of the hand lever 58, a retractile coil spring 72 is coupled at one end to the pawl 62 adjacent its end remote from that which engages in the teeth 44 and the opposite end of said spring 72 is coupled to a lever arm 74 which is pivotally connected to the pawl 66 between its pivot point 68 and the end which engages the teeth 44. A link 76 is connected to the lever arm 74 near the spring 72 and to a hand grip 78 which is pivoted as at 80 to the lever 58 adjacent its end remote from the rock lever 56. It will thus be seen that by moving the grip 78 about its pivot 80, pull will be exerted on the link 76 to cause the pawls 62 and 66 to move about their respective pivots 60 and 68 against the effort of their respective springs 64 and 70 so that upon rocking the hand lever 58 the shoe, 46, bracket arm 48 and carriage 50 may be lowered.

The ring-shaped carriage 50 is provided adjacent one side with an inwardly extending annular flange 82 which forms a guide for one side of a ring-shaped carrier 84 which is mounted within the carriage 50 to rotate with relation thereto. A retaining ring 86 is fastened to the carriage 50 on the side opposite the flange 82 and cooperates with the flange in holding the carrier 84 in proper position within the carriage. Formed on one side of the ring-shaped carrier 84 is an annular row of teeth 88 forming a crown gear, and mounted for rotation in a suitable bracket 90 fixed as by bolts 92 (Figure 3) to the carriage 50 is a crank shaft 94 which extends upwardly and rearwardly and terminates in a crank arm 96 near the upward and rearward terminal of the hand lever 58 so as to be within easy reach of the operator of the tractor when he is occupying the seat 20. The end of the shaft 94 remote from the crank arm 96 is equipped with a head 98 having formed on its end a spiral flange 100 (Figure 7) which is adapted to mesh with the teeth 88 of the ring-shaped carrier so that when the crank shaft 94 is rotated in the bracket 90, the spiral flange 100 will successively engage the teeth 88 and cause the carrier 84 to rotate within the carriage 50. Owing to the angular position of the shaft 94 and head 98 with relation to the teeth 88 of the carrier 84 as illustrated in Figure 2 it will be evident that only the topmost portion of the spiral flange 100 engages in a space between the teeth 88. Extending transversely of the ring-shaped carrier 84 is a pair of spaced parallel guides 102 and mounted for sliding movement between said guides is a cross head 104. As illustrated in Figure 2, the guides 102 are curved outwardly and their inner and outer edges lie concentric about the axis of the universal joint 38. Supported in the cross head 104 intermediate its ends is a drive shaft housing 106, one end of which is equipped with a bell which fits within the bell-shaped portion of the universal joint housing 40, while the opposite end of the drive shaft housing 106 carries a gear case 108, and mounted for rotation within the drive shaft housing 106 is a drive shaft 110, one end of which is coupled to the universal joint 38 while the opposite end carries a bevel drive pinion 112 housed within the gear case 108 previously referred to.

Mounted for rotation within the gear case 108 about an axis which lies at an angle of approximately 105 degrees from the axis of the shaft 110 is a driven shaft 114 carrying a pinion 116 which meshes with the drive pinion 112 so that when the shaft 110 is rotated, the shaft 114 will be rotated in unison therewith. As illustrated in Figure 6, the shaft 114 projects through one side of the gear casing 108 and has clamped thereon in a conventional manner a circular saw blade 118 which operates in a plane lying substantially 15 degrees from the axis of the shaft 110.

Fixed to the carrier 84 and adjacent opposite ends of the guides 102 are convergent arms 120 (Figures 2 and 3) which extend rearwardly and terminate adjacent the axis of the universal joint 38. Suitable brackets 122 are welded or otherwise fixed to the tubular housing 106 of the shaft 110 adjacent the universal joint housing 40 and pivotally coupled to these brackets 122 as at 124 adjacent their rear convergent ends are the arms 120. Extending transversely between the forward ends of each pair of bracket arms 120 is a shaft 126 carrying guide pulleys 128, and supported between a pair of brackets 130 fixed to the tubular housing 106 near the bell housing 40 is a guide pulley 132. The guide pulley 132 lies perpendicular to the guide pulleys 128, and mounted to rotate in brackets 134 in diametrically opposite relation on the shaft housing 106 are guide pulleys 136, the axes of which lie perpendicular to the axis of the guide pulley 132 and parallel with the axes of the guide pulleys 128. A suitable cylinder 138 is carried by the shaft housing 106 and has mounted therein for movement in parallel relation with the longitudinal axis of the shaft housing 106 a piston which is coupled to a piston rod 140 which operates through the end of the cylinder 138 remote from the carriage 50. Fixed to the outer end of the piston rod 140 and projecting radially therefrom is a finger 142 to which one end of a cable 144 is coupled. This cable is trained over one of the pulleys 136 and an adjacent pulley 128 and has its opposite end coupled as at 146 to the tubular housing 106 adjacent the carrier 84. Extending radially from the outer end of the piston rod 140 and perpendicular to the finger 142 is a finger 148 to which one end of a cable 150 is fixed. This cable is trained over the pulley 132 and thence back over the pulleys 136 and 128 on the opposite side of the tubular housing 106 and the end of the cable 150 is anchored as at 152 to the tubular housing 106 at a point diametrically opposite the anchorage 146 of the cable 144. It will thus be seen that as the piston within the cylinder moves the piston rod 140 toward the pulley 132, the tubular housing 106 and cross head 104 will be moved between the guides 102 toward the top of the carrier 184 when viewed as in Figure 2, and when the piston rod 140 is moved in the opposite direction, the tubular housing 106 will be moved toward the bottom of the carrier 84 when viewed as in Figure 2. As illustrated in Figure 2, the cylinder 138 is provided adjacent the end through which the piston rod 140 projects with a port 154, and adjacent its opposite end with a port 156 to which tubular conduits 158 and 160 (Figure 1) respectively, are coupled. The opposite ends of the tubular conduits 158 and 160 are connected through the medium of a suitable control valve 162 to a suitable source of fluid pressure such as a pump and reservoir 164 of conventional form carried by the tractor 10. The valve 162 is preferably located on the tractor within easy reach of the occupant of the seat 20.

Carried by the frame 24 near its forward end is a standard 166 carrying at its upper end a horizontally extending arm 168 which projects outwardly and terminates at a point substantially directly above the axis of the carriage 50. Mounted for rotation about a horizontal axis adjacent the end of the arm remote from the standard 166 is a guide pulley 170 and a similar pulley 172 is mounted on the standard adjacent its junction with the arm 168. A similar guide pulley 174 is mounted adjacent the lower end of the standard 166 to rotate about an axis which ties perpendicular to the axes of the pulleys 170 and 172, and trained over these pulleys is a suitable cable 176, one end of which is coupled to an eye 178 fixed to the carriage 50 in the top thereof. A cylinder 180 is carried on the frame 24 adjacent the standard 166 and is equipped with a conventional piston having a piston rod 182 which extends through the upper end of the cylinder 180 and has pivotally connected thereto a cross member 184 to which the end of the cable 176 remote from that coupled to the eye 178 is attached. It will thus be seen that as the piston moves within the cylinder 180 to advance the piston rod 182, pull will be exerted on the cable 176 to assist in elevating the carriage 50 and the mechanism carried thereby. The cable 176 is coupled to the cross arm 184 through the medium of a suitable detachable coupling 186, so that the operative connection between the piston rod 182 and the cable may be discontinued at the will of the operator.

Mounted on the cross member 184 adjacent the end remote from the coupling 186 is a channel member 188 carrying an eccentric clamp 190 which works through a slot in one of the flanges of the channel member 188 for engaging one side of a tree pusher 192 (Figure 1). As illustrated one end of the tree pusher 192 enters the space between the flanges of the channel member 188 and upon moving the eccentric clamp 190, the tree pusher will be held in place. The end of the tree pusher remote from that which is entered into the channel member 188 carries a spike 194 which is adapted to engage a tree or other object so that as the sawing process advances, the tree or other object of work may be pushed away from the saw blade by advancing the piston within the cylinder 180, and thus moving the tree pusher 192 toward the work. The cylinder 180 is provided with ports to which suitable conduits 196 and 198 are coupled to admit fluid respectively to the bottom and top of the cylinder 180. These conduits 196 and 198 are connected with a suitable control valve 200 which, as illustrated in Figure 1, is connected with the source of fluid pressure supply 164 so that when the valve 200 is manipulated the direction of flow of fluid through the conduits 196 and 198 may be regulated to raise or lower the cross member 184. Like the valve 162, the valve 200 is located within easy reach of the occupant of the seat 20 of the tractor 10.

Mounted on the axle 16 on opposite sides of the tractor 10 are collars 202 to which the rear ends of the members 204 forming parts of a saw guard designated generally 206 are coupled. A third member 208 of the saw guard is coupled as at 210 to the tractor 10 adjacent the forward end thereof.

In use when it is desired to fell timber, the hand crank 96 is rotated to cause the carrier 84 to rotate within the carriage 50 and move the saw blade 118 into a substantially horizontal position. The device is then set into motion by manipulating the clutch handle 34 to cause power to be transmitted through the medium of the clutch 30 and shaft 28 to the drive shaft 110. The power thus transmitted to the shaft 110 will be transmitted through the gears 112 and 116 to the shaft 114, thus setting the saw 118 into motion. The saw guard 206 having been disconnected at 210 from the tractor may be swung upwardly out of the way so that upon advancing the tractor toward the tree or other work to be felled, the saw blade 118 may be guided against the work. As the sawing progresses, the work will tend to close the kerf made by the saw blade therein, and in order to relieve the saw blade of such a pinching effect, the spike 194 is advanced into the tree or work by operating the piston within the cylinder 180 so that the tree pusher 192 will push the upper portion of the work away from the saw. In so doing it is obvious that the kerf will be opened, thus permitting the saw to feed through the work. The feed of the saw is governed by manipulating the valve 162 to cause the piston to move within the cylinder 138 and through the medium of fluid pressure operating within the cylinder 138 causing the cross head 104 to move between the guides 102 and force the housing 106 and consequently the saw blade 118 toward the work.

When it is desired to cut felled logs into shorter lengths, the hand crank 96 is rotated to cause the carrier 84 to rotate within the carriage 50 until the saw blade 118 is moved into a vertical position. In this position the saw blade may be advanced through the work by the same mechanism employed for advancing it through work in a vertical position, and as the sawing takes place, the blade is advanced by moving the cross head 104 between the guides 102. Obviously, the tree pusher 192 will find no utility when sawing logs lying on the ground, and hence may be easily and quickly removed by manipulating the eccentric 190. Vertical adjustment of the position of the carriage may be achieved by rocking the hand lever 58, or in some instances when desired, the cable 176 may be coupled to the cross member 184 of the cylinder 180, and the carriage may be elevated by fluid pressure. In any event so long as no pressure is exerted on the hand grip 78, the pawls 62 and 66 will function to hold the carriage elevated.

While in the foregoing there has been shown and described the preferred embodiment of this invention, it is to be understood that minor changes in the details of construction and arrangement of parts may be resorted to without Having described the invention, what is claimed as new is:

1. A saw attachment for a farm tractor having a power take-off, said attachment comprising a horizontally extending carriage mounted on such a tractor to move upwardly and downwardly in an arc adjacent one side of said tractor, a ring-shaped carrier mounted on said carriage to rotate about an axis which lies normal to said carriage, a cross head mounted in said carrier to move diametrically thereof, a drive shaft mounted in said cross head to rotate about its longitudinal axis and to move with said cross head, a saw mounted adjacent one end of the drive shaft for movement therewith, means establishing driving connection between the drive shaft and the saw, drive means mounted on the tractor adjacent the opposite end of the drive shaft, said drive means having driving connection with said drive shaft, and means establishing driving connection between the power take-off of the tractor and the drive means.

2. A saw attachment for a farm tractor having a power take-off, said attachment comprising a ring-shaped carrier mounted on such a tractor to rotate about an axis which lies alongside of the tractor, a cross head mounted in said carrier to move diametrically thereof, a drive shaft mounted in said cross head to rotate about its longitudinal axis and to move with said cross head, a saw mounted adjacent one end of the drive shaft to move in unison therewith, a driving connection between the drive shaft and the saw and a driving connection between the power take-off and the drive shaft.

3. A saw attachment for a farm tractor having a power take-off, said attachment comprising a ring-shaped carrier mounted on such a tractor to rotate about an axis which lies alongside of the tractor, a cross head mounted in said carrier to move diametrically thereof, a drive shaft mounted in said cross head to rotate about its longitudinal axis and to move with said cross head, a saw mounted adjacent one end of the drive shaft to move in unison therewith, a driving connection between the drive shaft and the saw, a driving connection between the power take-off and the drive shaft and means adjacent the drive shaft and coupled to the cross head positively to move said cross head relative to the carrier.

4. A saw attachment for a farm tractor having a power take-off, said attachment comprising a ring-shaped carrier mounted on such a tractor to rotate about an axis which lies alongside of the tractor, a cross head mounted in said carrier to move diametrically thereof, a drive shaft mounted in said cross head to rotate about its longitudinal axis and to move with said cross head, a saw mounted adjacent one end of the drive shaft to move in unison therewith, a driving connection between the drive shaft and the saw, a driving connection between the power take-off and the drive shaft and means carried by the tractor adjacent the carrier positively to rotate the carrier about the axis alongside of the tractor.

5. A saw attachment for a farm tractor having a power take-off, said attachment comprising a ring-shaped carrier mounted on such a tractor to rotate about an axis which lies alongside of the tractor, a cross head mounted in said carrier to move diametrically thereof, a drive shaft mounted in said cross head to rotate about its longitudinal axis and to move with said cross head, a saw mounted adjacent one end of the drive shaft to move in unison therewith, a driving connection between the drive shaft and the saw, a driving connection between the power take-off and the drive shaft, means carried by the tractor adjacent the carrier positively to rotate the carrier about the axis alongside of the tractor and means mounted adjacent the drive shaft and coupled to the cross head positively to move said cross head relative to the carrier.

6. A saw attachment for a farm tractor having a power take-off, said attachment comprising a ring-shaped carrier mounted on such a tractor to rotate about an axis which lies alongside of the tractor, a cross head mounted in said carrier to move diametrically thereof, a drive shaft mounted in said cross head to rotate about its longitudinal axis and to move with said cross head, a saw mounted adjacent one end of the drive shaft to move in unison therewith, a driving connection between the drive shaft and the saw, a driving connection between the power take-off and the drive shaft and manually actuated means carried by the tractor adjacent the carrier positively to rotate the carrier about the axis alongside of the tractor.

7. A saw attachment for a farm tractor having a power take-off attachment comprising a ring-shaped carrier mounted on such a tractor to rotate about an axis which lies alongside of the tractor, a cross head mounted in said carrier to move transversely thereof, a drive shaft mounted in said cross head to rotate about its longitudinal axis and to move with said cross head, a saw mounted adjacent one end of the drive shaft to move in unison therewith, a driving connection between the drive shaft and the saw, a driving connection between the power take-off and the drive shaft, manually actuated means carried by the tractor adjacent the carrier positively to rotate the carrier about the axis alongside of the tractor, hydraulically actuated means mounted adjacent the drive shaft and coupled to the cross head positively to move said cross head relative to the carrier and means on the tractor to govern the flow of hydraulic fluid to and from the hydraulically actuated means.

8. A saw attachment for a farm tractor having a power take-off, said attachment comprising a horizontally extending carriage mounted on such a tractor to move upwardly and downwardly in an arc adjacent one side of said tractor, a ring-shaped carrier mounted on said carriage to rotate about an axis which lies normal to the carriage, a cross head mounted in said carrier to move transversely thereof, a drive shaft mounted in said cross head to rotate about its longitudinal axis and to move with said cross head, a saw mounted adjacent one end of the drive shaft for movement therewith, means establishing driving connection between the drive shaft and the saw, drive means mounted on the tractor adjacent the opposite end of the drive shaft, said drive means having driving connection with said drive shaft, means establishing driving connection between the power take-off of the tractor and the drive means and means carried by the tractor and coupled to the carriage for moving said carriage through its vertical arc.

9. A saw attachment for a farm tractor having a power take-off, said attachment comprising a horizontally extending carriage mounted on such a tractor to move upwardly and downwardly in an arc adjacent one side of said tractor, a ring-shaped carrier mounted on said carriage to rotate about an axis which lies normal to the carriage, a cross head mounted in said carrier to move transversely thereof, a drive shaft mounted in said cross head to rotate about its longitudinal axis and to move with said cross head, a saw mounted adjacent one end of the drive shaft for movement therewith, means establishing driving connection between the drive shaft and the saw, drive means mounted on the tractor adjacent the opposite end of the drive shaft, said drive means having driving connection with said drive shaft, means establishing driving connection between the power take-off of the tractor and the drive means, means carried by the tractor and coupled to the carriage for moving said carriage through its vertical arc and means mounted adjacent the drive shaft and coupled to the cross head positively to move said cross head transversely of the carrier.

10. A saw attachment for a farm tractor having a power take-off, said attachment comprising a horizontally extending carriage mounted on such a tractor to move upwardly and downwardly in an arc adjacent one side of said tractor, a ring-shaped carrier mounted on said carriage to rotate about an axis which lies normal to the carriage, a cross head mounted in said carrier to move transversely thereof, a drive shaft mounted in said cross head to rotate about its longitudinal axis and to move with said cross head, a saw mounted adjacent one end of the drive shaft for movement therewith, means establishing driving connection between the drive shaft and the saw, drive means mounted on the tractor adjacent the opposite end of the drive shaft, said drive means having driving connection with said drive shaft, means establishing driving connection between the power take-off of the tractor and the drive means, means carried by the tractor and coupled to the carriage for moving said carriage through its vertical arc, means mounted adjacent the drive shaft and coupled to the cross head positively to move said cross head transversely of the carrier and means carried by the tractor adjacent the carriage and connected to the carrier to rotate the latter with reference to the carriage.

11. In a saw attachment for a tractor having a power take-off, a horizontally extending carriage mounted on such a tractor to move upwardly and downwardly in an arc adjacent one side of the tractor, a ring-shaped carrier mounted in the carriage to rotate about an axis which lies normal to the carriage, spaced parallel guides extending transversely through the carrier, a cross head mounted to move in said guides, a drive shaft housing carried by the cross head, a drive shaft mounted within the housing to rotate about the longitudinal axis thereof, a saw mounted on the housing adjacent one end thereof, means establishing driving connection between the drive shaft and the saw and means at the opposite end of the housing selectively to establish driving connection between the power take-off of the tractor and the saw.

12. In a saw attachment for a tractor having a power take-off, a horizontally extending carriage mounted on such a tractor to move upwardly and downwardly in an arc adjacent one side of the tractor, a ring-shaped carrier mounted in the carriage to rotate about an axis which lies normal to the carriage, spaced parallel guides extending transversely through the carrier, a cross head mounted to move in said guides, a drive shaft housing carried by the cross head, a drive shaft mounted within the housing to rotate about the longitudinal axis thereof, a saw mounted on the housing adjacent one end thereof, means establishing driving connection between the drive shaft and the saw, means at the opposite end of the housing selectively to establish driving connection between the power take-off of the tractor and the saw, manually controlled means to rotate the carrier within the carriage and thereby rotate the saw about the longitudinal axis of the drive shaft, means to raise and lower the carriage through the vertical arc and means to move the cross head between said guides.

ROY C. WAY.

REFERENCES CITED

The following references are of record in the file of this patent:

UNITED STATES PATENTS

| Number | Name | Date |
|---|---|---|
| 2,312,287 | Renner | Feb. 23, 1943 |
| 2,365,408 | Hillyer | Dec. 19, 1944 |
| 2,404,655 | Randall | July 23, 1946 |
| 2,411,623 | Jaques | Nov. 26, 1946 |
| 2,426,694 | King | Sept. 2, 1947 |
| 2,455,840 | Webb | Dec. 7, 1948 |
| 2,462,314 | Fuqua | Feb. 22, 1949 |